United States Patent [19]

Burger et al.

[11] Patent Number: 4,929,647

[45] Date of Patent: May 29, 1990

[54] COMPOSITIONS WHICH CAN BE CROSSLINKED BY RADIATION TO FORM ELASTOMERS

[75] Inventors: Christa Burger; Johann Müller; Erhard Bosch, all of Burghausen, Fed. Rep. of Germany

[73] Assignee: Wacker-Chemie GmbH, Munich, Fed. Rep. of Germany

[21] Appl. No.: 221,960

[22] Filed: Jul. 8, 1988

[30] Foreign Application Priority Data

Jul. 15, 1987 [DE] Fed. Rep. of Germany ....... 3723421

[51] Int. Cl.$^5$ ...................... C08L 83/08; C08G 77/04
[52] U.S. Cl. ...................................... 522/99; 524/862; 524/860; 524/861; 528/31; 528/32; 525/478
[58] Field of Search .................. 522/99; 524/861, 860, 524/862; 528/32, 31; 525/478

[56] References Cited

U.S. PATENT DOCUMENTS

| | | | |
|---|---|---|---|
| 4,376,210 | 3/1983 | Chang | 522/99 |
| 4,487,905 | 12/1984 | Mitchell | 525/478 |
| 4,554,339 | 11/1985 | Hockemeyer et al. | 528/26 |
| 4,595,471 | 6/1986 | Preiner et al. | 522/29 |
| 4,675,346 | 6/1987 | Lin et al. | 522/39 |
| 4,701,503 | 10/1987 | Sato | 528/32 |
| 4,766,170 | 8/1988 | Homma et al. | 524/500 |

FOREIGN PATENT DOCUMENTS

3603738 8/1987 Fed. Rep. of Germany.

*Primary Examiner*—Melvyn I. Marquis
*Assistant Examiner*—Ralph H. Dean Jr.

[57] ABSTRACT

Compositions which can be crosslinked by radiation to form elastomers comprising (a) an organopolysiloxane containing triorganosiloxane units of the formula $$H_2C=CHCXOR^1SiR_2O_{\frac{1}{2}}$$

in which R is selected from monovalent hydrocarbon radicals and halogenated monovalent hydrocarbon radicals, $R^1$ is selected from divalent hydrocarbon radicals and divalent halogenated hydrocarbon radicals and X is selected from oxygen and sulfur, in which at least 80 percent of the siloxane units other than the triorganosiloxane units are diorganosiloxane units, where the SiC-bonded organic radicals of the triorganosiloxane units and the diorganosiloxane units are selected from monovalent hydrocarbon radicals and halogenated monovalent hydrocarbon radicals, (b) a filler having a surface area of at least 50 m$^2$/g, and if necessary (c) a photoinitiator, where the organopolysiloxane (a) contains diorganosiloxane units in which one of the SiC-bonded organic radicals contains an aliphatic carbon-carbon double bond, and/or the compositions contain, in addition to components (a), (b) and if necessary (c), and at least one (d) organopolysiloxane resin containing units of the formulas $$R^2{}_3SiO_{\frac{1}{2}} \text{ and } R^2SiO_{3/2} \text{ and/or } SiO_{4/2}$$

where $R^2$ is selected from monovalent hydrocarbon radicals, halogenated hydrocarbon radicals and hydrogen, with the proviso that at least an average of 4 Si-bonded hydrogen atoms are present in each molecule of the polysiloxane resins, in which siloxane units of the formula $$HSR^1SiRO$$

in an amount of from 0.1 to 5 such siloxane units per radical of the formula $$H_2C=CHCXOR^1,$$

where R, $R^1$ and X are the same as above, are excluded in organopolysiloxane (a) if the organopolysiloxane resin (d) is omitted from the compositions.

28 Claims, No Drawings

COMPOSITIONS WHICH CAN BE CROSSLINKED BY RADIATION TO FORM ELASTOMERS

The present invention relates to compositions which can be crosslinked to form elastomers and more particularly to compositions which can be crosslinked by radiation to form elastomers.

BACKGROUND OF THE INVENTION

Compositions which can be crosslinked by ultraviolet light and which are based on (a) an organopolysiloxane having an acryloxy group and containing triorganosiloxane units of the formula $$H_2C=CHCOOR''SiR'_2O_{\frac{1}{2}}$$

in which R' represents the same or different monvalent hydrocarbon radicals which are free of aliphatic double bonds, and R'' represents a divalent hydrocarbon radical, in which at least 80 percent of the siloxane units other than the triorganosiloxane units are diorganosiloxane units in which in both siloxane units SiC-bonded organic radicals are monovalent hydrocarbon radicals free of aliphatic double bonds, (b) a filler having a specific surface area of at least 50 $m^2/g$, and (c) a photoinitiator are described in European Patent Application No. EP-OS 152,179 to Loctite Corporation.

It is, therefore, an object of the present invention to provide compositions which can be crosslinked by radiation to form elastomers. Another object of the present invention is to provide a crosslinkable composition containing (a) an organopolysiloxane having triorganosiloxane units, (b) a filler having a surface area of at least 50 $m^2/g$, and (c) a photoinitiator, if desired, and which can be crosslinked by radiation. A further object of the present invention is to provide a composition which can be crosslinked rapidly and at room temperature by ultra-violet light, and which, on crosslinking, form elastomers having especially good physical properties such as high tear strength and high tear propagation resistance.

SUMMARY OF THE INVENTION

The foregoing objects and others which will become apparent from the following description are accomplished in accordance with this invention, generally speaking, by providing compositions which can be crosslinked by radiation to form elastomers comprising (a) an organopolysiloxane containing triorganosiloxane units of the formula $$H_2C=CHCXOR^1SiR_2O_{\frac{1}{2}}$$

in which R represents the same or different monovalent hydrocarbon radicals and halogenated monovalent hydrocarbon radicals which are free of aliphatic multiple bonds, $R^1$ represents the same or different divalent hydrocarbon radicals and halogenated divalent hydrocarbon radicals which are free of aliphatic multiple bonds, and X represents oxygen or sulphur, and at least 80 percent of the siloxane units other than the triorganosiloxane units are diorganosiloxane units in which the SiC-bonded organic radicals in both siloxane units are monovalent hydrocarbon radicals, or halogenated monovalent hydrocarbon radicals, (b) a filler having a specific surface area of at least 50 $m^2/g$, and where appropriate (c) a photoinitiator, in which the organopolysiloxane (a) contains diorganosiloxane units where one of the SiC-bonded organic radicals contains an aliphatic carbon-carbon double bond, and/or wherein the compositions contain, in addition to components (a), (b) and where appropriate (c), at least one (d) organopolysiloxane resin having units of the formulas $$R_3{}^2SiO_{\frac{1}{2}} \text{ and}$$

$$R^2SiO_{3/2} \text{ and/or}$$

$$SiO_{4/2}$$

where $R^2$ represents the same or different monovalent hydrocarbon radicals or halogenated monovalent hydrocarbon radicals, or hydrogen, with the proviso that only one hydrogen atom is bonded in each case to one and the same silicon atom, and an average of at least 4 Si-bonded hydrogen atoms are present in each molecule of the organopolysiloxane resins. The presence of siloxane units of the formula $$HSR^1SiRO,$$

in which R and $R^1$ are the same as above, in an amount of from 0.1 to 5 such siloxane units per radical of the formula $$H_2C=CHCXOR^1-$$

is excluded in organopolysiloxane (a) if the organopolysiloxane resin (d) is not present in the compositions.

DESCRIPTION OF THE INVENTION

When the crosslinkable organopolysiloxane (a) containing triorganosiloxane units of the formula $$H_2C=CHCXOR^1SiR_2O_{\frac{1}{2}},$$

in which R, $R^1$ and X are the same as above, does not contain an organopolysiloxane resin (d) having units of the formula $$R_3{}^2O_{\frac{1}{2}} \text{ and}$$

$$R^2SiO_{3/2} \text{ and/or}$$

$$SiO_{4/2},$$

where $R^2$ is the same as above, then siloxane units of the formula $$HSR^1SiRO-$$

in an amount of from 0.1 to 5 such siloxane units per radical of the formula $$H_2C=CHCXOR^1-,$$

where R, $R^1$ and X are the same as above, are excluded from organopolysiloxane (a) because of European Patent Application No. 87 101 641.6.

The organopolysiloxanes (a) are preferably those of the formula $$H_2C=CHCXOR^1SiR_2O(SiR_2O)_m(SiRR^3O)_nSiR_2\text{-}R^1OXCHC=CH_2 \quad (I)$$

in which R, $R^1$ and X are the same as above and $R^3$ represents the same or different monovalent SiC-bonded organic radicals containing an aliphatic carbon-carbon double bond, m is an integer having a value of at least 10, and n is 0 or an integer having a value of from 1 to 10 and more preferably n is 3, 4, 5 or 6.

Although these siloxane units are not shown in the preferred organopolysiloxane (a), represented by formula I, up to about 5 mole percent, based on the entire molecule or all the molecules of this type, of other siloxane units may be present as impurities which are more or less difficult to avoid. Examples of such siloxane units which may be present in the organopolysiloxane (a), in addition to the siloxane units shown in formula (I) are those of the formula $$R_3^2SiO_{\frac{1}{2}}, R^2SiO_{3/2}$$

where $R^2$ is the same as above or $SiO_{4/2}$ units.

The sum of m+n in organopolysiloxanes (a) is preferably a number which corresponds to a mean viscosity of from 10 to 100,000 mPa.s at 25° C.

In the siloxane units indicated by formula I, X is preferably oxygen.

Each of the monovalent and divalent SiC-bonded organic radicals in the compositions of this invention, and thus the radicals represented by R, $R^1$, $R^2$ and $R^3$, preferably contain a maximum of 18 carbon atoms per radical.

Examples of hydrocarbon radicals represented by R are alkyl radicals, such as the methyl, ethyl, n-propyl, isopropyl, n-butyl, sec-butyl and octadecyl radicals; cycloalkyl radicals, such as the cyclohexyl and methylcyclohexyl radicals; aryl radicals, such as the phenyl and xenyl radicals, alkaryl radicals, such as the tolyl radicals; and aralkyl radicals, such as the benzyl and beta-phenylethyl radicals.

Examples of halogenated hydrocarbon radicals represented by R are the 3-chloropropyl, 3,3,3-trifluoropropyl and o-, p- and m-chlorophenyl radicals.

Due to their availability, at least 95 percent of the radicals represented by R are preferably methyl radicals.

In addition to the siloxane units mentioned heretofore, the organopolysiloxanes (a) may contain units of the formula $$RR^4SiO$$

in which R is the same as above and $R^4$ is a monovalent hydrocarbon radical which is substituted by a group other than at least one halogen atom. Examples of substituted hydrocarbon radicals represented by $R^4$ are, in particular, cyanoalkyl radicals, such as the beta-cyanoethyl radical.

The radical represented by $R^1$ is preferably a radical of the formula $$-(CH_2)_r-$$

which r is an integer having a value of from 1 to 6, and more preferably r is 3.

Preferred triorganosiloxane units of the formula $$H_2C=CHCXOR^1SiR_2O_{\frac{1}{2}}$$

in the organopolysiloxane (a), and thus in formula (I), are those of the formula $$H_2C=CHCOO(CH_2)_3Si(CH_3)_2O$$

and more preferably radicals of the formula $$H_2C=CHCXOR^1-$$

are those of the formula $$H_2C=CHCOO(CH_2)_3-.$$

However, $R^1$ may, for example, be a branched alkyl radical, such as a radical of the formula $$-CH_2CH(CH_3)CH_2 \text{ or}$$

$$-CH_2CH(CH_3)-.$$

Likewise, the radicals represented by $R^1$ may, for example, be phenylene and/or alkarylene radicals, such as those of the formula $$-(CH_2)C_6H_4-.$$

Examples of halogenated radicals represented by $R^1$ are o-, p- and m-chlorophenyl radicals.

Examples of radicals represented by $R^3$ are the vinyl and allyl radicals, and radicals of the formula $$H_2C=CHCXOR^1-$$

in which $R^1$ and X are the same as above.

Organopolysiloxanes (a) which are represented by formula (I), where n is 0 have been disclosed in European Patent Application No. EP-OS 152,179. Organopolysiloxanes (a) which are represented by formula (I), where n is at least 1 can be prepared in a manner which is known per se, for example, by equilibration of an organopolysiloxane of formula (I) using a mixed hydrolysate of dimethyldichlorosilane and vinylmethyldichlorosilane.

The preferred filler (b) is silicon dioxide having a specific surface area of at least 50 m²/g. This may be pyrogenically produced silicon dioxide, silica hydrogels which have been dehydrated while maintaining the structure, i.e., so-called "aerogels", or other types of precipitated silicon dioxide having a specific surface area of at least 50 m²/g, or mixtures of at least two such types of silicon dioxide. The silicon dioxide may be hydrophilic, or if it has been treated, for example, in a ball mill with, for example, a water-repellent organosilicon compound, such as trimethylethoxysilane, dimethyldichlorosilane, octamethylcyclotetrasiloxane or hexamethyldisilazane, in the presence or absence of some of organopolysiloxane (a) used in the preparation of the compositions of this invention, then it may be hydrophobic. Silicon dioxide having a specific surface area of at least 100 m²/g which has been rendered hydrophobic by treatment with hexamethyldisilazane is particularly preferred.

The values for specific surface areas are BET values, i.e., values which are determined by means of nitrogen adsorption in accordance with ASTM Special Technical Publication, No. 51 (1941), pages 95 ff.

The compositions of this invention preferably contain filler (b) in an amount of from 5 to 50 percent by weight, and more preferably from 15 to 35 percent by weight, based on the total weight of the particular composition.

The compositions of this invention are crosslinked by exposure to radiation to form elastomers. Sources of radiation which may be employed are electron irradiation, gamma irradiation, X-ray irradiation or preferably, depending on the activity of the photoinitiator (c) present in each of these compositions, daylight, light having a wavelength of from 400 to 600 nm (nanometers), i.e., so-called "halogen light", or ultra-violet light, or a mixture of at least two such types of irradiation, and in particular at least two such types of light. Light having a wavelength of from 200 to 300 nm is particularly preferred. The ultra-violet light may be produced, for example, in xenon lamps, low-pressure mercury vapor lamps, medium-pressure mercury vapor lamps or high-pressure mercury vapor lamps.

If the compositions of this invention are to be crosslinked by means of at least one of the types of light mentioned above, they must contain at least one photoinitiator (c). Photoinitiators which may be present are any photoinitiators which can be present in light-crosslinkable compositions. Examples of suitable photoinitiators (c) are anthraquinone and substituted anthraquinones, such as chloroanthraquinone; benzophenone and substituted benzophenones, such as hydroxybenzophenones, 2,4-bis(trimethylsiloxy)benzophenones, 4-methylbenzophenone, 4-chlorobenzophenone, 4,4'-dimethoxybenzophenone and 4-chloro-4'-benzylbenzophenone; xanthone and substituted xanthones, such as 3-chloroxanthone, 3,9-dichloroxanthone and 3-chloro-8-nonylxanthone; acetophenone and substituted acetophenones, such as diethoxyacetophenone, 2-hydroxy-2-methyl-1-phenylpropan-1-one, trichlorobutylacetophenone, 3-methylacetophenone, 4-methylacetophenone and 3-bromoacetophenone; benzoin and substituted benzoins, such as benzoin alkyl ethers, for example, benzoin methyl ether, benzoins in which the hydrogen atom of the hydroxyl group in the benzoin is replaced by a silicon atom of a cyclic organopolysiloxane, such as described in German Patent Application No. DE-OS 3,123,676 (Shin-Etsu Chemical Co., Ltd.), and benzoin derivatives which are obtained by reacting benzoin with, for example, triethanolamine in the absence of halogen bonded directly to silicon, in the absence of acid which is more acidic than benzoin, and in the absence of a base which is more basic than triethanolamine; thioxanthone and substituted thioxanthones; benzil and substituted benzils, such as benzil ketals; and also fluorenone and substituted fluorenones. Additional examples of photoinitiators (c) which may be employed are mesityl oxide, propiophenone, benzaldehyde, carbazole and Michler's ketone.

Preferred photoinitiators (c) are those which are soluble in the compositions of this invention. The solubility of the photoinitiators (c) can easily be determined by simple small-scale experiments.

If they are to be crosslinked by means of at least one of the types of light mentioned above, the compositions of this invention preferably contain a photoinitiator (c) in an amount of from 0.05 to 10 percent by weight, and more preferably from 0.5 to 6 percent by weight, based on the total weight of the particular composition.

If, in addition to the triorganosiloxane units of the formula $$H_2C=CHCXOR^1SiR_2O_{\frac{1}{2}}$$

the organopolysiloxane (a) contains no SiC-bonded organic radicals containing an aliphatic carbon-carbon double bond or if n is 0 in formula (I), the compositions of this invention must contain at least one organopolysiloxane resin containing units of the formulas $$R_3^2SiO_{\frac{1}{2}} \text{ and}$$

$$R^2SiO_{3/2} \text{ or}$$

$$SiO_{4/2}$$

or containing units of the formulas $$R_3^2SiO_{\frac{1}{2}}, R^2SiO_{3/2} \text{ and } SiO_{4/2}$$

in which $R^2$ is the same as above.

If, in addition to the triorganosiloxane units of the formula $$H_2C=CHCXOR^1SiR_2O_{\frac{1}{2}}$$

the organopolysiloxane (a) contains SiC-bonded organic radicals containing an aliphatic carbon-carbon double bond or if n is at least 1 in formula (I), the compositions of this invention may contain at least one organopolysiloxane resin containing units of the formulas $$R_3^2SiO_{\frac{1}{2}} \text{ and}$$

$$R^2SiO_{3/2} \text{ or}$$

$$SiO_{4/2}$$

or containing units of the formulas $$R_3^2SiO_{\frac{1}{2}}, R^2SiO_{3/2} \text{ and } SiO_{4/2}$$

in which $R^2$ is the same as above.

The examples of SiC-bonded organic radicals represented above for R and $R^3$ also apply to the SiC-bonded organic radicals represented by $R^2$. However, it is preferred that $R^2$ has the same meaning as R, and more preferably that it is a methyl radical when $R^2$ is not hydrogen.

Organopolysiloxane resins containing units of the formulas $$R_3^2SiO_{\frac{1}{2}} \text{ and } SiO_{4/2}$$

where $R^2$ is the same as above are preferred.

Organopolysiloxane resins containing units of the formulas $$HR_2SiO_{\frac{1}{2}} \text{ and } SiO_{4/2}$$

where R is the same as above is especially preferred.

The ratio between the number of units of the formula $$R^2SiO_{3/2}$$

and the number of units of the formula $$R_3^2SiO_{\frac{1}{2}}$$

or the ratio between the number of units of the formula $$SiO_{4/2}$$

and the number of units of the formula $$R_3^2SiO_{\frac{1}{2}}$$

or the ratio between the number of units of the formulas $R^2SiO_{3/2}$ and $SiO_{4/2}$ and the number of units of the formula $$R_3^2SiO_{\frac{1}{2}}$$

is preferably 0.1:1 to 3:1, preferably 0.2:1 to 2:1 and more preferably 0.3:1 to 1:1.

The organopolysiloxane resins containing the substituents $R^2$ may be prepared in a manner which is known per se, for example, by reacting a silane of the formula $$R^2Si(OR^4)_3$$

in which $R^2$ is the same as above, and $R^4$ represents the same or different alkyl radicals having from 1 to 4 carbon atoms per radical, such as methyltrimethoxysilane, and/or a silane of the formula $$Si(OR^4)_4$$

in which $R^4$ is the same as above, such as tetraethoxysilane, with at least one disiloxane of the formula $$R_3^2SiOSiR_3^2$$

in which $R^2$ is the same as above, such as 1,3-dihydrogen-1,1,3,3-tetramethyldisiloxane, and water in the presence of a catalyst for such reactions, such as concentrated hydrochloric acid.

The organopolysiloxane resins containing the substituents $R^2$ may be liquid at room temperature and have a viscosity of at least 100 mPa.s at 25° C., or they may be solid at room temperature. They are preferably liquid and have a viscosity of from 500 to 20,000 mPa.s at 25° C., and more preferably from 1,000 to 10,000 mPa.s at 25° C.

The organopolysiloxane resins containing the substituents $R^2$ are preferably present in the compositions of this invention in amounts of from 1 to 25 percent by weight, and more preferably in resin amounts of from 2 to 20 percent by weight, based on the total weight of the particular composition.

In addition to the essential components (a) and (b), and, if appropriate (c) and (d), the compositions of this invention may contain additional substances which were present heretofore in compositions which can be crosslinked by means of irradiation, and in particular light. Examples of such additional substances are fillers having a specific surface area of less than 50 m²/g, such as quartz sand, chalk powder or diatomaceous earth, as well as fillers which are hydrophilic or hydrophobic, organic dyes, in particular those which promote the effectiveness of photoinitiators since they (the dyes) have absorption maxima in the range of from 300 to 500 nm, such as Nitrazine Yellow, Disperse Orange 3 and/or Nile Blue A, additives for preventing thermal crosslinking, anti-aging agents and agents for improving the adhesion of the crosslinked organopolysiloxanes to the substrates on which they were produced, such as butanedioldiacrylates, gamma-glycidoxypropyltrimethoxysilane and organopolysiloxanes of formula (I), in which m is 0 or an integer having the value of 1 to 9.

The compositions of this invention can be produced by simply mixing the components with one another. Volatile components can be removed from these compositions by reducing the pressure, for example, to 1 hPa (abs.) after mixing.

The compositions of this invention may be employed in all applications in which compositions which can be crosslinked by radiation to form elastomers can be employed, for example, in the formation of coatings, for example, of organic fiber or glass fiber textiles, including optical fibers. These compositions can be used for coatings which repel adhesive substances, in the formation of moldings, such as O-rings, in the formation of gaskets, including so-called "formed in place gaskets", so long as entry of light is ensured, for example through a window, made, for example, from window glass, if the irradiation is light, in the formation of films and membranes, in forming insulation for electrical or electronic components, such as hybrid integrated circuits, for example, for electronic ignition systems, of modules, photovoltaic solar generators and other semiconductor arrangements.

When the compositions are used for coatings, it is preferred that the coating be from 0.5 mm to 2 cm in thickness.

In the following examples, all parts and percentages are by weight, unless otherwise specified.

Preparation of the organopolysiloxanes used in the following examples:

(A) (a) About 800 parts of an organopolysiloxane of the formula $$HSi(CH_3)_2O[Si(CH_3)_2O]_9Si(CH_3)_2H$$

which contains one Si-bonded hydrogen atom in each of the terminal units are added dropwise to a mixture warmed to 80° C. containing 116 parts of allyl alcohol and 4.6 parts by volume of a 1 percent strength solution of platinum in the form of $PtCl_6.6H_2O$ in isopropanol. The mixture is subsequently stirred for one hour at 100° C. When the organopolysiloxane thus obtained, which, according to the nuclear magnetic resonance spectrum, has the formula $$HO(CH_2)_3Si(CH_3)_2O[Si(CH_3)_2O]_9Si(CH_3)_2(CH_2)_3OH,$$

has cooled to 50° C., it is mixed with 100 parts of acid-treated montmorillonite, 432 parts of acrylic acid and 0.65 parts of bis(tert-butyl)cresol (an agent to prevent polymerization of the acrylic acid). The resultant mixture is warmed for 2 hours at 110° C. with stirring. The montmorillonite is subsequently filtered off. After the substances boiling up to 80° C. at 130 hPa (abs.) have been removed from the filtrate by distillation, 860 parts (90.6 percent of theory) of a pale yellowish, clear oil which, according to nuclear magnetic resonance spectrum, has the formula $$H_2C=CHCOO(CH_2)_3Si(CH_3)_2O[Si(CH_3)_2O]_9Si(CH_3)_2(CH_2)_3OOCHC=CH_2,$$

are obtained.

(b) A mixture containing 62.4 parts of a dimethylpolysiloxane which contains one Si-bonded hydroxyl group in each of the terminal units and contains an average of 100 silicon atoms per molecule, 2.4 parts of an organopolysiloxane containing acryloxypropyl groups whose preparation is described in (a) above, and 11 parts of toluene is refluxed for 2 hours after mixing with 0.054 part of a 25 percent strength solution of phosphonitrilic chlorides in methylene chloride. The water formed during the reaction is collected in a Dean-Stark trap. The phosphonitrilic chlorides are deactivated by adding 0.108 part of triisononylamine. The solution is then filtered through a layer of activated charcoal and diatomaceous earth. The components boiling up to 80° C. at 100 Pa (abs.) are removed from the filtrate by distillation. The colorless, clear oil obtained in a yield of 63 parts (97 percent of theory) has a viscosity of 4,200 mPa.s at 25° C.

(B) The procedure described in (b) above is repeated, except that 2 parts of the organopolysiloxane containing acryloxypropyl groups in the terminal units, the preparation of which is described above in Example (A)(a), are substituted for 2.4 parts of this organopolysiloxane. The colorless, clear oil obtained in a yield of 62.5 parts (97 percent of theory) has a viscosity of 6,000 mPa.s at 25° C.

(C) The procedure described in (A) (b) above is repeated, except that 1.75 parts of the organopolysiloxane containing acryloxypropyl groups in the terminal units, the preparation of which is described in (A) (a) above, are substituted for 2.4 parts of this organopolysiloxane. The colorless, clear oil obtained in a yield of 62 parts (96 percent of theory) has a viscosity of 11,500 mPa.s at 25° C.

(D) About 82 parts of the organopolysiloxane containing acryloxypropyl groups in the terminal units, the preparation of which is described in (A) (a), above, are first added to a mixture containing 2,990 parts of a dimethylpolysiloxane containing one Si-bonded hydroxyl group in each of the terminal units and having an average of 80 silicon atoms per molecule, and 96 parts by weight of a copolymer containing 80 mol percent of dimethylsiloxane units and 20 mol percent of vinylmethylsiloxane units, containing one Si-bonded hydroxyl group in each of the terminal units and having a viscosity of 120 mPa.s at 25° C. and then 1.3 parts by volume of a 25 percent strength solution of phosphonitrilic chlorides in methylene chloride are added to the resultant mixture. The mixture thus obtained is warmed at 100° C. for 75 minutes under the pressure of the surrounding atmosphere and at 100° C. for 15 minutes at 2 hPa (abs.). The phosphonitrile chlorides are neutralized by adding 2 parts of tert-octylamine. About 2,978 parts (94 percent of theory) of a colorless, clear oil having a viscosity of 13,400 mPa.s at 25° C. are obtained after filtering off the neutralized products. According to the nuclear magnetic resonance spectrum, it contains an average of 720 dimethylsiloxane units, 5 vinylmethylsiloxane units and 2 acryloxypropyl groups per molecule.

(E) A mixture containing 72 parts of water and 3 parts of concentrated hydrochloric acid is added dropwise to a vigorously stirred mixture containing 416 parts of tetraethoxysilane and 134 parts of 1,3-dihydrogen-1,1,3,3-tetramethyldisiloxane. The resultant mixture is stirred for one hour at 110° C. under the pressure of the surrounding atmosphere, the components which boiled under these conditions are allowed to distill off. The mixture is then neutralized by adding 6 parts of magnesium oxide and filtered. The filtrate is dried using sodium sulfate. After decanting off the solution from the sodium sulfate, the components boiling up to 40° C. at 1 hPa (abs.) are removed by distillation using a rotary evaporator. About 187 parts (96 percent of theory) of a colorless, clear oil are obtained which has a viscosity of 3,500 mPa.s at 25° C. It contains 0.8 dimethylhydrogensiloxane units per $SiO_{4/2}$ unit.

(F) A mixture containing 52 parts of water and 5.9 parts of concentrated hydrochloric acid is added dropwise to a rapidly stirred mixture containing 356 parts of methyltriethoxysilane and 150 parts of 1,3-dihydrogen-1,1,3,3-tetramethyldisiloxane. The resultant mixture is stirred at room temperature for 1 hour, refluxed for 1 hour while stirring and, after cooling to about 40° C., neutralized by adding 6 parts of calcium carbonate and stirred for 30 minutes. The mixture is then filtered, and the components boiling up to 40° C. at 1 hPa (abs.) are removed from the filtrate by distillation. About 195 parts (91 percent of theory) of a colorless, clear oil are recovered which has a viscosity of 1,050 mPa.s at 25° C. It contains 0.6 dimethylhydrogensiloxane units per $CH_3SiO_{3/2}$ unit.

EXAMPLES (1) TO (6) AND COMPARATIVE EXAMPLES (A) TO (D)

In a laboratory kneader, the substances shown in the following table and 2 percent of 2-hydroxy-2-methyl-1-phenylpropan-1-one, based on the total weight of the particular mixture, are mixed with one another.

The compositions thus obtained are cast in shallow molds 2 mm or 6 mm in depth. The molds are covered with window glass having a thickness of 2 mm in order to produce elastomers having a smooth surface, and the contents of the molds are irradiated through the window glass at a distance of 10 cm using a commercially available ultraviolet lamp ("Beltrolux", a registered trademark of Beltron GmbH, D-6074 Rödermark) for 30 seconds in the case of the molds having a depth of 2 mm and for 60 seconds in the case of the remaining molds. The following table also contains values obtained from physical testing of the elastomeric sheets thus obtained.

TABLE

| Example or comparative experiment | Organopolysiloxane, prepared according to percent | Organopolysiloxane, prepared according to percent | Silicon dioxide percent | Shore A Hardness | Physical Test Values | | |
|---|---|---|---|---|---|---|---|
| | | | | | (2) $N/mm^2$ | (3) Percent | (4) $N/mm^2$ |
| (1) | A 65.6 | 7.4 | 25 | 40 | 4.6 | 430 | 32.3 |
| (a) | A 65.6 | 0 | 32.4 | 36 | 3.5 | 260 | 16.6 |
| (2) | A 68.6 | 4.4 | 25 | 36 | 6.3 | 580 | 29.4 |
| (b) | A 68.6 | 0 | 29.4 | 32 | 3.3 | 290 | 9.1 |
| (3) | B 65.6 | 4.4 | 25 | 30 | 5.1 | 420 | 24.5 |
| (c) | B 65.6 | 0 | 29.4 | 29 | 2.8 | 320 | 15.8 |
| (4) | C 68.6 | 4.4 | 25 | 23 | 4.2 | 710 | 25 |
| (d) | C 68.6 | 0 | 29.4 | 25 | 2.9 | 650 | 18.5 |
| (5) | D 73 | 0 | 25 | 27 | 7.2 | 900 | 43.3 |

TABLE-continued

| Example or comparative experiment | Organopolysiloxane, prepared according to percent | Organopolysiloxane, prepared according to percent | Silicon dioxide percent | Shore A Hardness | Physical Test Values | | |
|---|---|---|---|---|---|---|---|
| | | | | | (2) N/mm$^2$ | (3) Percent | (4) N/mm$^2$ |
| (6) | B 65.6 | 4.4$^{(5)}$ | 25 | 29 | 3.6 | 380 | 18.2 |

(1) Pyrogenically produced silicon dioxide having a surface area of 300 m$^2$/g which has been treated with hexamethyldisilazane to impart hydrophobic properties thereto.
(2) Tear resistance.
(3) Elongation at break.
(4) Tear propagation resistance.
(5) Organopolysiloxane prepared in accordance with (F) instead of (E).

What is claimed is:

1. A composition which can be crosslinked by radiation to form elastomers comprising (a) an organopolysiloxane containing triorganosiloxane units of the formula $$H_2C=CHCXOR^1SiR_2O_{\frac{1}{2}}$$

in which R is selected from the group consisting of monovalent hydrocarbon radicals and halogenated monovalent hydrocarbon radicals which are free of aliphatic multiple bonds, $R^1$ is selected from the group consisting of divalent hydrocarbon radicals and halogenated divalent hydrocarbon radicals which are free of aliphatic multiple bonds and X is selected from the group consisting of oxygen and sulphur, in which at least 80 percent of the siloxane units other than the triorganosiloxane units are diorganosiloxane units, where the SiC-bonded organic radicals of the diorganosiloxane units are selected from the group consisting of monovalent hydrocarbon radicals and halogenated monovalent hydrocarbon radicals, and wherein the organopolysiloxane (a) contains diorganosiloxane units one of those whose SiC-bonded bonded organic radicals contains an aliphatic carbon-carbon double bond, (b) a filler having a surface area of at least 50 m$^2$/g and (d) at least one organopolysiloxane resin comprising units selected from the group consisting of
  (i) $R_3^2SiO_{\frac{1}{2}}$ and $R^2SiO_{3/2}$,
  (ii) $R_3^2SiO_{\frac{1}{2}}$, $R^2SiO_{3/2}$ and $SiO_{4/2}$ and
  (iii) $R_3^2SiO_{\frac{1}{2}}$ and $SiO_{4/2}$
where $R^2$ is independently selected from the group consisting of monovalent hydrocarbon radicals, halogenated monovalent hydrocarbon radicals and hydrogen, with the proviso that only one hydrogen atom is bonded to one and the same silicon atom, and an average of at least 4 Si-bonded hydrogen atoms are present in each molecule of the organopolysiloxane resin.

2. The composition of claim 1, wherein the composition contains (c) a photoinitiator.

3. The composition of claim 1, wherein the organopolysiloxane (a) is represented by the formula $$H_2C=CHCXOR^1SiR_2O(SiR_2O)_m(SiRR^3O)_nSiR_2-R^1OXCHC=CH_2$$

in which R is selected from the group consisting of monovalent hydrocarbon radicals and halogenated monovalent hydrocarbon radicals which are free of aliphatic multiple bonds, $R^1$ is selected from the group consisting of divalent hydrocarbon radicals and halogenated divalent hydrocarbon radicals and X is selected from the group consisting of oxygen and sulfur, $R^3$ is a monovalent SiC-bonded organic radical containing an aliphatic carbon-carbon double bond, m is an integer having a value of at least 10, and n is an integer having a value of 1 to 10.

4. The composition of claim 1, wherein X is oxygen.

5. The composition of claim 1, wherein the organopolysiloxane resin (d) comprises units of the formulas $$R_3^2SiO_{\frac{1}{2}} \text{ and } SiO_{4/2}$$

in which $R^2$ is selected from the group consisting of monovalent hydrocarbon radicals, halogenated monovalent hydrocarbon radicals and hydrogen.

6. The composition of claim 1, wherein the organopolysiloxane resin (d) comprises units of the formulas $$R_3^2SiO_{\frac{1}{2}} \text{ and } R^2SiO_{3/2}$$

in which $R^2$ is selected from the group consisting of monovalent hydrocarbon radicals, halogenated monovalent hydrocarbon radicals and hydrogen.

7. The composition of claim 1, wherein the organopolysiloxane resin (d) comprises units of the formulas $$R_3^2SiO_{\frac{1}{2}}, R^2SiO_{3/2} \text{ and } SiO_{4/2}$$

in which $R^2$ is selected from the group consisting of monovalent hydrocarbon radicals, halogenated monovalent hydrocarbon radicals and hydrogen.

8. The composition of claim 1, wherein the organopolysiloxane resin (d) comprises units of the formulas $$HR_2SiO_{\frac{1}{2}} \text{ and } SiO_{4/2}$$

where R is selected from the group consisting of monovalent hydrocarbon radicals and halogenated monovalent hydrocarbon radicals.

9. The composition of claim 1, wherein the ratio between the number of units of the formula $$SiO_{4/2}$$

and the number of units of the formula $$R_3^2SiO_{\frac{1}{2}}$$

in the organopolysiloxane resin (d) is 0.1:1 to 3:1, in which $R^2$ is selected from the group consisting of monovalent hydrocarbon radicals, halogenated monovalent hydrocarbon radicals and hydrogen.

10. The composition of claim 1, wherein the ratio between the number of units of the formula $$R^2SiO_{3/2}$$

and the number of units of the formula $$R_3^2SiO_{\frac{1}{2}}$$

in the organopolysiloxane resin (d) is 0.1:1 to 3:1, in which $R^2$ is selected from the group consisting of monovalent hydrocarbon radicals, halogenated monovalent hydrocarbon radicals and hydrogen.

11. The composition of claim 1, wherein the ratio between the number of units of the formulas $$R^2SiO_{3/2} \text{ and } SiO_{4/2}$$

and the number of units of the formula $$R_3{}^2SiO_{\frac{1}{2}}$$

in the organopolysiloxane resin (d) is 0.1:1 to 3:1, in which $R^2$ is selected from the group consisting of monovalent hydrocarbon radicals, halogenated monovalent hydrocarbon radicals and hydrogen.

12. The composition of claim 1, wherein the ratio between the number of units of the formula $$SiO_{4/2}$$

and the number of units of the formula $$R_3{}^2SiO_{\frac{1}{2}}$$

in the organopolysiloxane resin (d) is 0.3:1 to 1:1, in which $R^2$ is selected from the group consisting of monovalent hydrocarbon radicals, halogenated monovalent hydrocarbon radicals and hydrogen.

13. The composition of claim 1, wherein the ratio between the number of units of the formula $$R^2SiO_{3/2}$$

and the number of units of the formula $$R_3{}^2SiO_{\frac{1}{2}}$$

in the organopolysiloxane resin (d) is 0.3:1 to 1:1, in which $R^2$ is selected from the group consisting of monovalent hydrocarbon radicals, halogenated monovalent hydrocarbon radicals and hydrogen.

14. The composition of claim 1, wherein the ratio between the number of units of the formulas $$R^2SiO_{3/2} \text{ and } SiO_{4/2}$$

and the number of units of the formula $$R_3{}^2SiO_{\frac{1}{2}}$$

in the organopolysiloxane resin (d) is 0.3:1 to 1:1, in which $R^2$ is selected from the group consisting of monovalent hydrocarbon radicals, halogenated monovalent hydrocarbon radicals and hydrogen.

15. A composition which can be crosslinked by radiation to form elastomers comprising (a) an organopolysiloxane containing triorganosiloxane units of the formula $$H_2C=CHCXOR^1SiRO_{\frac{1}{2}}$$

in which R is selected from the group consisting of monovalent hydrocarbon radicals and halogenated monovalent hydrocarbon radicals which are free of aliphatic multiple bonds, $R^1$ is selected from the group consisting of divalent hydrocarbon radicals and halogenated divalent hydrocarbon radicals which are free of aliphatic multiple bonds and X is selected from the group consisting of oxygen and sulphur, in which at least 80 percent of the siloxane units other than the triorganosiloxane units are diorganosiloxane units, where the SiC-bonded organic radicals of the diorganosiloxane units are selected from the group consisting of monovalent hydrocarbon radicals and halogenated monovalent hydrocarbon radicals, (b) a filler having a surface area of at least 50 m²/g and (d) at least one organopolysioxane resin comprising units selected from the group consisting of (i) $R_3{}^2SiO_{\frac{1}{2}}$ and $R^2SiO_{3/2}$,
(ii) $R_3{}^2SiO_{\frac{1}{2}}$, $R^2SiO_{3/2}$ and $SiO_{4/2}$ and
(iii) $R_3{}^2SiO_{\frac{1}{2}}$ and $SiO_{4/2}$ where $R^2$ is independently selected from the group consisting of monovalent hydrocarbon radicals, halogenated monovalent hydrocarbon radicals and hydrogen, with the proviso that only one hydrogen atom is bonded to one and the same silicon atom, and an average of at least 4 Si-bonded hydrogen atoms are present in each molecule of the organopolysiloxane resin.

16. The composition of claim 15, wherein the composition contains (c) a photoinitiator.

17. The composition of claim 15, wherein the organopolysiloxane (a) is a composition of the formula $$H_2C=CHCXOR^1SiR_2O(SiR_2O)_mSiR_2\text{-}R^1OXCHC=CH_2$$

in which R is selected from the group consisting of monovalent hydrocarbon radicals and halogenated monovalent hydrocarbon radicals which are free of aliphatic multiple bonds, $R^1$ is selected from the group consisting of divalent hydrocarbon radicals and halogenated divalent hydrocarbon radicals and X is selected from the group consisting of oxygen and sulfur, and m is an integer having a value of at least 10.

18. The composition of claim 17, wherein X is oxygen.

19. The composition of claim 15, wherein the organopolysiloxane resin (d) comprises units of the formulas $$R_3{}^2SiO_{\frac{1}{2}} \text{ and } SiO_{4/2}$$

in which $R^2$ is selected from the group consisting of monovalent hydrocarbon radicals, halogenated monovalent hydrocarbon radicals and hydrogen.

20. The composition of claim 15, wherein the organopolysiloxane resin (d) comprises units of the formulas $$R_3{}^2SiO_{\frac{1}{2}} \text{ and } R^2SiO_{3/2}$$

in which $R^2$ is selected from the group consisting of monovalent hydrocarbon radicals, halogenated monovalent hydrocarbon radicals and hydrogen.

21. The composition of claim 15, wherein the organopolysiloxane resin (d) comprises units of the formulas $$R_3{}^2SiO_{\frac{1}{2}}, R^2SiO_{3/2} \text{ and } SiO_{4/2}$$

in which $R^2$ is selected from the group consisting of monovalent hydrocarbon radicals, halogenated monovalent hydrocarbon radicals and hydrogen.

22. The composition of claim 15, wherein said organopolysiloxane resin (d) comprises units of the formulas $$HR_2SiO_{\frac{1}{2}} \text{ and } SiO_{4/2}$$

where R is selected from the group consisting of monovalent hydrocarbon radicals and halogenated monovalent hydrocarbon radicals.

23. The composition of claim 15, wherein the ratio between the number of units of the formula $$SiO_{4/2}$$

and the number of units of the formula $$R_3{}^2SiO_{\frac{1}{2}}$$

in the organopolysiloxane resin (d) is 0.1:1 to 3:1, in which $R^2$ is selected from the group consisting of monovalent hydrocarbon radicals, halogenated monovalent hydrocarbon radicals and hydrogen.

24. The composition of claim 15, wherein the ratio between the number of units of the formula $$R^2SiO_{3/2}$$

and the number of units of the formula $$R_3{}^2SiO_{\frac{1}{2}}$$

in the organopolysiloxane resin (d) is 0.1:1 to 3:1, in which $R^2$ is selected from the group consisting of monovalent hydrocarbon radicals, hydrogenated monovalent hydrocarbon radicals and hydrogen.

25. The composition of claim 15, wherein the ratio between the number of units of the formulas $$R^2SiO_{3/2} \text{ and } SiO_{4/2}$$

and the number of units of the formula $$R_3{}^2SiO_{\frac{1}{2}}$$

in the organopolysiloxane resin (d) is 0.1:1 to 3:1, in which $R^2$ is selected from the group consisting of monovalent hydrocarbon radicals, halogenated monovalent hydrocarbon radicals and hydrogen.

26. The composition of claim 15, wherein the ratio between the number of units of the formula $$SiO_{4/2}$$

and the number of units of the formula $$R_3{}^2SiO_{\frac{1}{2}}$$

in the organopolysiloxane resin (d) is 0.3:1 to 1:1, in which $R^2$ is selected from the group consisting of monovalent hydrocarbon radicals, halogenated monovalent hydrocarbon radicals and hydrogen.

27. The composition of claim 15, wherein the ratio between the number of units of the formula $$R^2SiO_{3/2}$$

and the number of units of the formula $$R_3{}^2SiO_{\frac{1}{2}}$$

in the organopolysiloxane resin (d) is 0.3:1 to 1:1, in the which $R^2$ is selected from the group consisting of monovalent hydrocarbon radicals, halogenated monovalent hydrocarbon radicals and hydrogen.

28. The composition of claim 15, wherein the ratio of the number of units of the formulas $$R^2SiO_{3/2} \text{ and } SiO_{4/2}$$

to the number of units of the formula $$R_3{}^2SiO_{\frac{1}{2}}$$

in the organopolysiloxane resin (d) is 0.3:1 to 1:1, in which $R^2$ is selected from the group consisting of monovalent hydrocarbon radicals, halogenated monovalent hydrocarbon radicals and hydrogen.

* * * * *